United States Patent
Borgstrom et al.

(10) Patent No.: US 10,712,151 B2
(45) Date of Patent: Jul. 14, 2020

(54) SENSOR DEVICE FOR DETERMINING ALIGNMENT/MISALIGNMENT OF A LASER BEAM RELATIVE TO A GAS NOZZLE OF A LASER MACHINING HEAD

(71) Applicant: Precitec GmbH & Co. KG, Gaggenau-Bad Rotenfels (DE)

(72) Inventors: Robert Borgstrom, Brighton, MI (US); Brian Smith, New Hudson, MI (US)

(73) Assignee: PRECITEC GMBH & CO. KG, Gaggenau-Bad Rotenfels (DE)

( * ) Notice: Subject to any disclaimer, the term of this patent is extended or adjusted under 35 U.S.C. 154(b) by 422 days.

(21) Appl. No.: 15/595,352

(22) Filed: May 15, 2017

(65) Prior Publication Data

US 2018/0328725 A1 Nov. 15, 2018

(51) Int. Cl.
*G01B 11/27* (2006.01)
*B23K 26/03* (2006.01)
(Continued)

(52) U.S. Cl.
CPC .......... *G01B 11/272* (2013.01); *B23K 26/032* (2013.01); *B23K 26/035* (2015.10); *B23K 26/042* (2015.10); *B23K 26/043* (2013.01); *B23K 26/14* (2013.01); *B23K 26/1494* (2013.01); *B23K 26/705* (2015.10); *G01B 11/005* (2013.01); *G01B 11/14* (2013.01); *G01B 11/27* (2013.01); *G01D 5/35341* (2013.01); *H04W 4/00* (2013.01)

(58) Field of Classification Search
CPC ....... G01B 11/272; G01B 11/27; G01B 11/14; G01B 11/005; B23K 26/043; B23K 26/042; B23K 26/705; B23K 26/1494; B23K 26/14; B23K 26/035; B23K 26/032; G01D 5/35341; H04W 4/00
See application file for complete search history.

(56) References Cited

U.S. PATENT DOCUMENTS 7,679,031 B2 * 3/2010 Yamazaki .......... B23K 26/0884
219/121.83
RE42,055 E * 1/2011 Raab ...................... B25J 18/002
33/1 PT
(Continued)

FOREIGN PATENT DOCUMENTS

DE 10 2004 005 902 B3 9/2005
EP 1211015 A1 * 6/2002 ......... B23K 26/1494
(Continued)

*Primary Examiner* — Nimeshkumar D Patel
*Assistant Examiner* — Tania Courson
(74) *Attorney, Agent, or Firm* — Muncy, Geissler, Olds & Lowe, P.C.

(57) ABSTRACT

The present invention relates to a sensor device for determining alignment/misalignment of a laser beam relative to a gas nozzle of a laser machining head which comprises a sensor housing provided with mounting means adapted to mount the housing to a laser machining head, a camera device comprising a camera, the camera device is provided in the sensor housing, so that the camera faces the tip of the gas nozzle when the sensor housing is mounted to the laser machining head for visualizing an orifice of the gas nozzle and a pilot laser simultaneously, and output means for outputting image signals obtained by the camera.

8 Claims, 3 Drawing Sheets

(51) Int. Cl.
  *B23K 26/035*  (2014.01)
  *G01B 11/00*   (2006.01)
  *G01B 11/14*   (2006.01)
  *G01D 5/353*   (2006.01)
  *B23K 26/70*   (2014.01)
  *B23K 26/042*  (2014.01)
  *B23K 26/14*   (2014.01)
  *B23K 26/04*   (2014.01)
  *H04W 4/00*    (2018.01)

(56) References Cited

U.S. PATENT DOCUMENTS

| | | | | |
|---|---|---|---|---|
| 8,547,421 | B2 * | 10/2013 | Yuan | H04N 5/23232 |
| | | | | 348/42 |
| 8,771,437 | B2 * | 7/2014 | Deica | B23K 7/008 |
| | | | | 148/195 |
| 8,987,634 | B2 * | 3/2015 | Pieger | B23K 26/043 |
| | | | | 219/121.63 |
| 9,200,978 | B2 * | 12/2015 | Meindl | B23K 26/1494 |
| 10,156,439 | B2 * | 12/2018 | Fay | G01B 11/27 |
| 10,166,630 | B2 * | 1/2019 | Schwarz | G01B 11/0608 |
| 2005/0263509 | A1 * | 12/2005 | Yamazaki | B23K 26/04 |
| | | | | 219/121.84 |
| 2017/0361399 | A1 * | 12/2017 | Toyama | B23K 26/146 |
| 2018/0281109 | A1 * | 10/2018 | Onodera | B23K 26/1438 |

FOREIGN PATENT DOCUMENTS

| | | | | |
|---|---|---|---|---|
| EP | 1 967 316 A1 | | 9/2008 | |
| EP | 1600247 A3 | * | 10/2008 | ......... B23K 26/0884 |
| EP | 2281655 A1 | * | 2/2011 | ........... B23K 26/043 |
| EP | 3403757 A1 | * | 11/2018 | ........... G01B 11/272 |
| WO | WO 2011/035888 A1 | | 3/2011 | |

\* cited by examiner

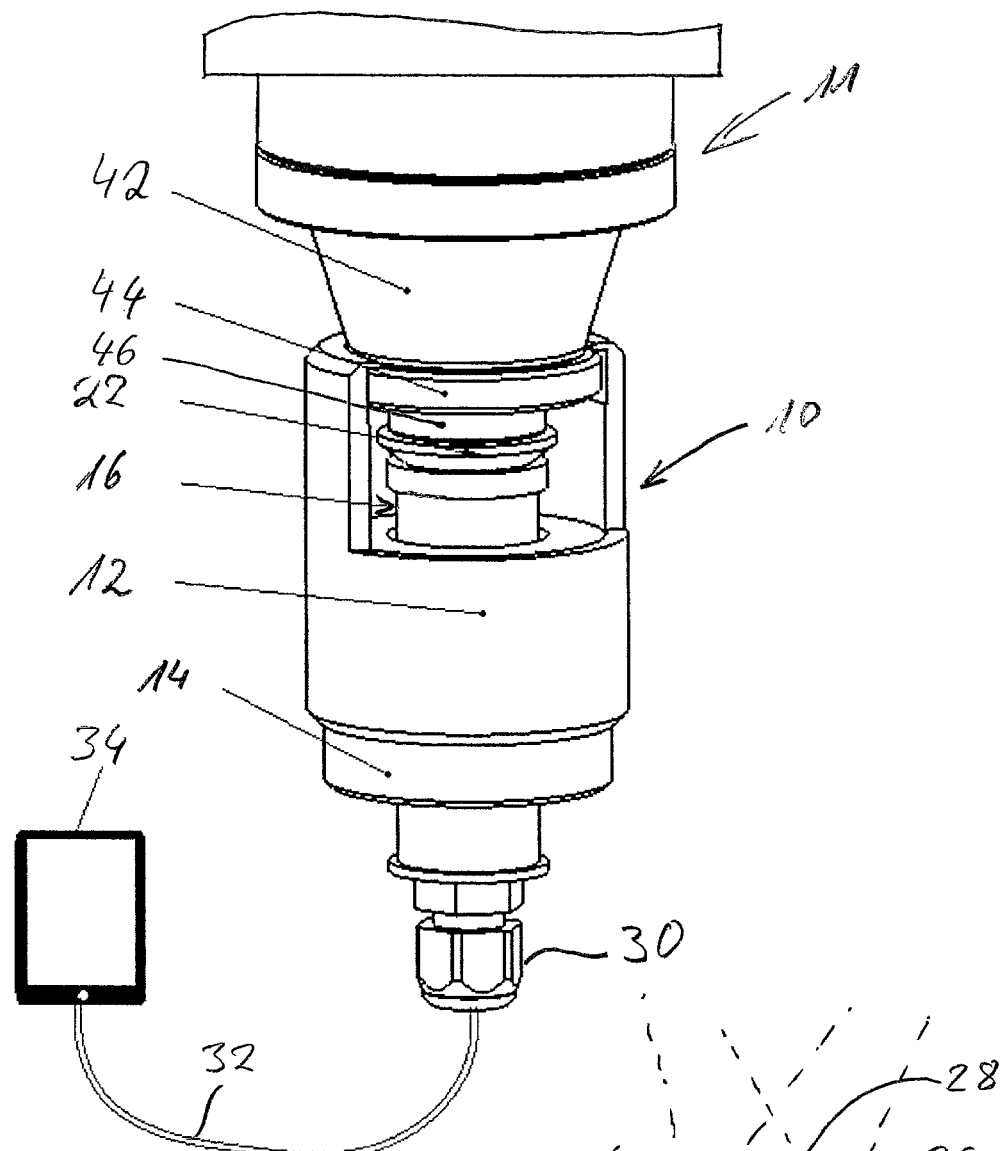
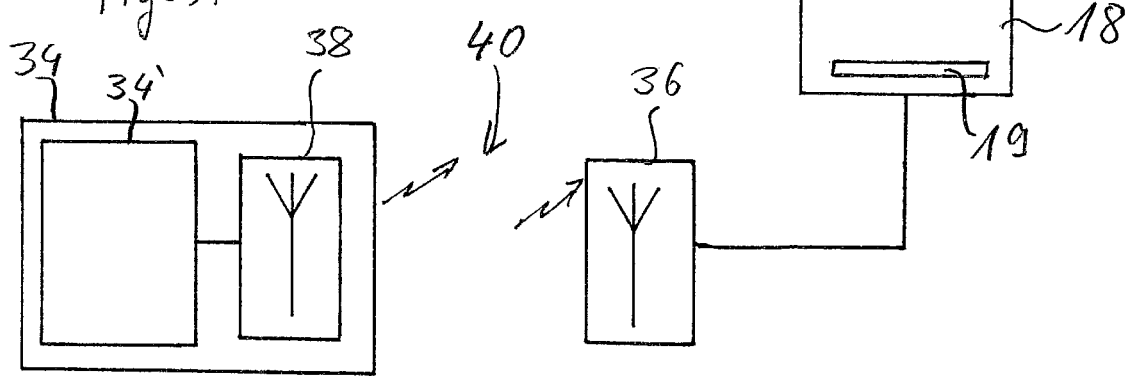

SENSOR DEVICE FOR DETERMINING ALIGNMENT/MISALIGNMENT OF A LASER BEAM RELATIVE TO A GAS NOZZLE OF A LASER MACHINING HEAD

TECHNICAL FIELD

The present invention relates to a sensor device for determining alignment/misalignment of a laser beam relative to a gas nozzle of a laser machining head, in particular, to a tool to determine the centricity of a laser beam relative to a gas nozzle, to be used in laser cutting machineries.

BACKGROUND ART

A fundamental requirement for successful laser cutting is that the exiting laser beam is sufficiently well centered to the orifice of a gas nozzle of a laser cutting head. If that is not the case, the cutting performance will not be uniform with respect to different cutting directions. Cut surface can get rough and in extreme cases the gas nozzle can get heated up to the point of melting. Reasons for misalignment can be poor mechanical tolerance of gas nozzles, improper alignment of focus lens (or collimator lens), a general alignment problem in the machine, e.g. improper alignment of the different mirrors for CO2-laser, effects from collisions between the laser cutting head and a workpiece.

By far the most common method is to use a series of beam shots on an adhesive tape target fixed to the gas or cutting nozzle. This requires the use of the actual laser beam at low power and short exposure (100 ms region). The contour of the nozzle orifice is visible as well as the resulting burn hole. This is an iterative process of repeatedly adjusting the laser beam and measuring the position of the burn hole relative to the nozzle orifice. Such process can take 5 to 10 minutes to complete depending on the skill level of the operator. This is usually followed by a cutting test observing the behavior of the blast of molten particles below the plate or sheet processed. However, the tape method poses a safety threat as it involves the use of a real laser beam.

In addition to the less sophisticated "tape method" described above there are a couple of attempts to use camera technology and fixed measuring stations.

DE 10 2004 005 902 B3 discloses an alignment unit to be used with a laser cutting head for adjusting the laser beam relative to an orifice of a cutting nozzle of the laser cutting head. The alignment unit comprises a housing in which a centering ring with an opening is provided for receiving the cutting nozzle when the laser cutting head is in a test position. Behind the centering ring an infrared conversion screen and a camera module are arranged in the beam path of the laser beam. To avoid damage to the alignment unit and/or the cutting nozzle when the laser cutting is brought into its test position the under-side of the housing of the alignment unit is provided with an elastic damping material.

When the laser cutting head is in the test position, i.e. the cutting nozzle rests on the centering ring, the laser beam is projected onto the infrared conversion screen. An image of the screen showing the current position of the laser beam is captured by the camera module and transmitted to a display.

EP 1 967 316 A1 discloses another system for determining a relative position of a nozzle of a laser machining head with respect to a laser beam axis. The system comprises a unit for lighting a part of the nozzle, a camera unit for recording an image of an orifice of the nozzle, and a unit for displaying the images acquired before and/or after processing. The laser machining head needs to be positioned with respect to the camera unit. Then, camera pictures are recorded before and after activation of a pilot laser. To determine the position of the laser beam relative to the opening of the nozzle image processing is performed.

None of the above solutions are considered portable, but each requires a fixed measuring position in the work envelope of the laser processing machine. This is a definite disadvantage, in particular when using CO2-lasers with mirror beam delivery systems. As a consequence alignment or misalignment of the laser beam relative to the nozzle opening cannot be measured in more than one position.

Further, a dedicated system for determining alignment or misalignment of the laser beam per laser processing machine can hardly be justified from a cost perspective.

DISCLOSURE OF THE INVENTION

The object underlying the present invention is to provide a sensor device for determining alignment/misalignment of a laser beam relative to a gas nozzle of a laser machining head, which can be easily used for adjusting more than one laser cutting machine in a fab shop environment, research institutes or industrial laboratories.

This object is achieved by a sensor device for determining alignment/misalignment of a laser beam relative to a gas nozzle of a laser machining head which comprises a sensor housing provided with mounting means adapted to mount the housing to a laser machining head, a camera device comprising a camera, the camera device is provided in the sensor housing, so that the camera faces the tip of the gas nozzle when the sensor housing is mounted to the laser machining head for visualizing an orifice of the gas nozzle and a pilot laser simultaneously, and output means for outputting image signals obtained by the camera.

In particular, the sensor device for determining alignment/misalignment of a laser beam relative to a gas nozzle of a laser machining head according to the present invention comprises a sensor housing, a camera device with a camera and an interface to output image signals obtained by the camera to an external display or evaluation unit. The sensor housing is provided with mounting means for mounting the sensor device in front of a gas nozzle of the laser machining head to the laser machining head. The camera device is arranged in the sensor housing in such a way that it is facing the tip of the nozzle when it is mounted to the laser machining head, so that the field of view of the camera includes the tip of the nozzle. Therefore, it is possible to monitor simultaneously both the orifice of the nozzle and a pilot laser beam to adjust the optical elements used for focusing the laser beam onto a workpiece so that the laser beam is centered with regard to the orifice of the nozzle and the laser focus is adjusted in the direction of the optical path.

Thus, the present invention provides a portable device or tool to determine the centricity of laser beam relative to a gas nozzle used in laser cutting machineries using any kind of laser sources like solid state lasers (YAG lasers, fiber lasers, disk lasers, diode lasers) or CO2 lasers. Since it is portable, it can serve more than one laser machine in a fab shop environment, research institutes and industrial laboratories.

Further, since a pilot laser, which is commonly factory mounted in modern laser sources, is used for adjusting the optical elements of the laser beam path it is not necessary to involve the use of the working laser beam used for the cut process thus causing no health hazard for operators.

According to a preferred embodiment of the present invention the camera device comprises an internal illumination assembly arranged around the camera for illuminating its field of view.

According to another embodiment of the present invention the camera device comprises a micro lens assembly arranged in front of the camera. Here the camera device preferably comprises an optical filter arranged in front of the micro lens assembly, wherein the spectral transparence of the filter is selected in view of the wavelength of the pilot laser and the spectral sensitivity of an image sensor of the camera. In particular, the filter can balance the intensities of the pilot beam and illumination source, in order not to over- or underexpose any part of the image, e.g. the beam or the nozzle. Further, the filter serves as a debris shield as it is easy to replace and does not need to be precisely aligned relative to the image sensor as well as improves the image quality.

According to a further embodiment of the present invention the camera device comprises centering means arranged in a defined distance in front of the camera and adapted to center the camera against the gas nozzle when the sensor housing is mounted to the laser machining head.

According to another preferred embodiment of the present invention the mounting means comprises an adapter detachably mounted to the housing. Here, the camera device and the adapter are supported by the housing in such a way that they can move relative to each other, so that the camera device can be pushed by a spring against the gas nozzle when the sensor housing is mounted to the laser machining head by means of the adapter.

Due to the adapter, or in particular interchangeable adapters the sensor device according to the present invention can be easily applied to the lower part of a conventional laser cutting head and requires no mounting tools.

According to another preferred embodiment of the present invention the output means comprises a wired or wireless interface. The wireless interface is preferable a Bluetooth interface. The Bluetooth version of the output interface offers easy measurements in various work locations of large travel X/Y laser cutting machines. This is in particular of help if the laser cutting machine is equipped with a CO2-laser.

BRIEF DESCRIPTION OF THE DRAWINGS

FIG. 1 is perspective view of a sensor device according to the present invention mounted to the lower part of a laser machining head, FIG. 2 is a simplified schematic block diagram of a camera unit of the sensor device according to the present invention and an external evaluation or display unit.

DETAILED DESCRIPTION OF THE INVENTION

Figure 3:
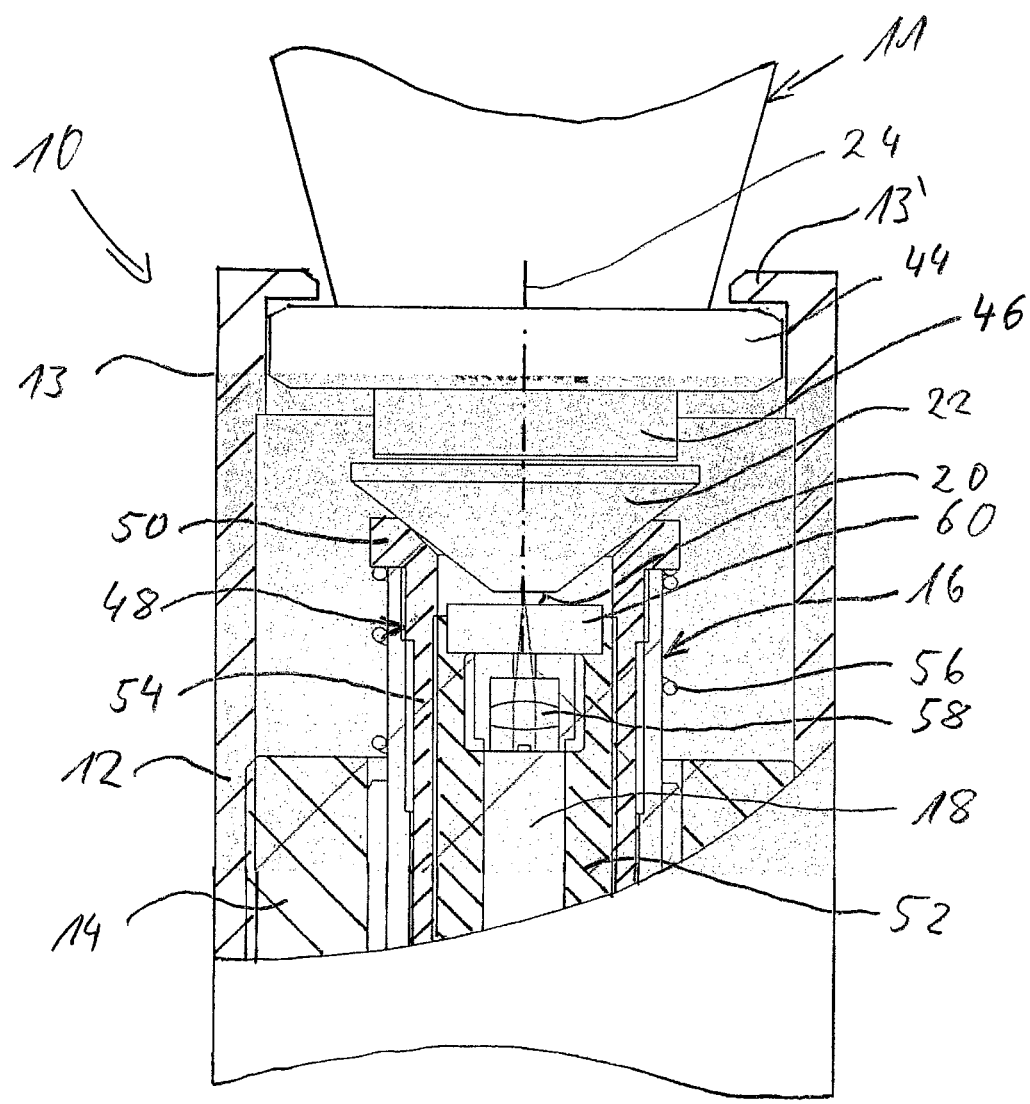
FIG. 3 is a sectional view of the sensor device shown in FIG. 1.

As shown in FIG. 1 as sensor device 10 according to the present invention is mounted directly to a by means of suitable mounting means. Although different means can be used to mount the sensor device 10 to the laser machining head 11 and to hold it safely thereon. In a preferred embodiment of the present invention as shown in FIG. 1 an adapter 12 is used which is detachably mounted to a sensor housing 14 of the sensor device 10 so that it can be interchanged with other adapters if the geometry of the laser machining head 11 differs from that shown in the drawings. The sensor device 10 further comprises a camera device 16 comprising a camera 18 (cf. FIG. 3). The camera device 16 is arranged in the sensor housing 14 in such a way that the camera 18 faces a tip 20 of a gas or cutting nozzle 22 when the sensor device 10 is mounted to the laser machining head 11 for visualizing an orifice 23 (cf. FIG. 4) of the gas nozzle 22 and a pilot laser 24 indicated in FIG. 3 by the optical axis of the laser beam path through the laser machining head 11. As schematically illustrated in FIG. 2, the camera device 16 is provided with an internal illumination assembly 26, arranged around the camera 18 or around a camera lens 28. The internal illumination assembly 26 serves to illuminate the camera's 18 field of view, in particular to illuminate the tip 20 of the gas or cutting nozzle 22 so that the orifice 23 of the nozzle 22 can be clearly imaged by the camera 18 even if it simultaneously images the pilot laser 24 in the plane of the orifice 23 of the nozzle 22.

Further, output means are provided for outputting image signals obtained by the camera 18. As shown in FIG. 1, the output means comprises a plug/socket assembly 30 for connecting a cable 32 the other end of which is connected to an external display or evaluation unit 34. The external display or evaluation unit 34 might be a tablet computer, a personal computer, a cell phone or the like.

According to an alternative embodiment of the present invention, an output of the camera 18 might be connected to a transceiver 36 for wireless communication with a corresponding transceiver 38 provided within the display or evaluation unit 34 which might be connected to a display unit 34' of the external display and evaluation unit 34. The transceivers 36, 38 form a wireless interface 40 for transmitting image signals from the camera 18 to the external evaluation or display unit 34 for displaying images of the orifice 23 of the nozzle 22 and of the pilot laser 24 taken by an image sensor 19 of the camera 18. According to a preferred embodiment, the transceivers 36, 38 are formed by Bluetooth units which offer easy measurements of the alignments or misalignments of a laser beam relative to a cutting nozzle 22 of a laser machining head 11 in various work locations of large travel X/Y machines.

Although it is possible to mount the sensor device 10 directly to the cutting nozzle 22 or to a capacitive sensor body 42 it is preferred to mount the sensor device 10 to a retaining ring 44 for the cutting nozzle 22 and an isolation part 46 for isolating the cutting nozzle 22 against the laser machining head. Here, an attachment portion 13 of the adapter 12 which is substantially C-shaped in a cross-section perpendicular to the optical path of the camera 18 and the laser machining head 11. The attachment portion 13 of the adapter 12 inserts onto the retaining ring 44 from the side so that an inwardly directed flange 13' of the attachment portion 13 abut against an upper side of the retaining ring 44 so as to hold the sensor device 10 on the laser machining head 11. In order to insert the adapter 12 and the camera device 16 concentrically to the intended beam axis of the laser beam, i.e. concentrically to the nozzle 22, the camera device 16 comprises centering means 48 having a tapered mating part 50 that centers against the tapered part of the cutting nozzle 22 itself. Since the camera 18 is mounted within a camera sleeve or housing 52 which is mounted within a cylinder part 54 of the centering means 48, the camera device 16 and, in particular, the camera 18 is concentrically arranged with the cutting nozzle 22 by means of the matting part 50 of the centering means 48. Thus, the field of view of the camera 18 is centered to the orifices of the cutting nozzle 22.

To hold the sensor device 10 firmly on the laser machining head 11, the camera device 16 is movably supported within the sensor housing 14 so that it can be moved relatively to the adapter 12. Further, to press the centering means 48 of the camera device 16 with its tapered mating part 50 against the nozzle 22 when the sensor device is mounted to the laser machining head 11 by means of the adapter 12, a spring 56, in particular a compression spring is provided which moves the camera device 16 in the direction of the flange 13' of the attachment portion 13 of the adapter 12. Thus, the spring 56 which is operatively arranged between the mating part 50 of the centering means 48 and the attachment portion 13 of the adapter 12 presses the mating part 50 against the nozzle 22 while the flange 13' of attachment portion 13 of the adapter 12 is pressed against the retaining ring 44, so that the sensor device 10 is clamped to the laser machining head 11.

To ensure that the camera 18 can take pictures of the tip 20 of the nozzle 22 simultaneously with the pilot laser in the plane of the tip 20, a micro lens assembly with a micro lens 58 is arranged in front of the camera 18 so that the focus of the camera 18 is on the tip 20 of the nozzle 22. Thus, the camera 18 monitors the plane of the tip 20 of the gas or cutting nozzle 22. In addition, an optical filter 60 is provided in front of the micro lens 58 so as to adjust the received intensity of the pilot laser and the intensity of the illumination light to the spectral sensitivity of an image sensor 19 of the camera 18 and to improve the image quality. In particular, the filter 60 can balance the intensities of the pilot laser beam and illumination source, in order not to over- or underexpose any part of the image, e.g. the beam or the nozzle. Here, a green filter is used so that the red pilot laser is reduced in intensity while nearly all of the illumination light may pass the filter 60. Further, the filter 60 is arranged just beneath the nozzle 22 when the sensor device 10 is mounted to the laser machining head 11 and therefore it serves as a debris shield instead of the micro lens 58 which is often mounted fixed in the camera device. Therefore, the filter 60 can act as a protective window, as it is easy to replace and does not need to be precisely aligned relative to the image sensor 19 of the camera 18.

Figure 4:
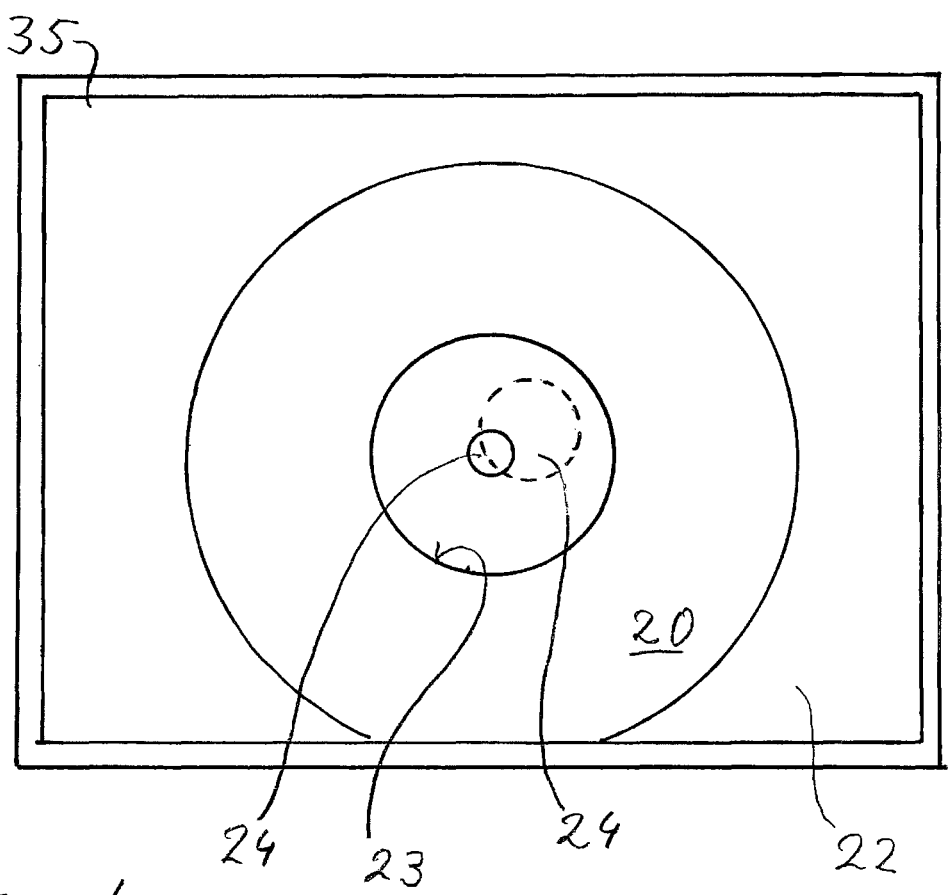
FIG. 4 is an illustration of a display showing a picture of a tip of a nozzle together with a pilot laser beam taken by a camera of the sensor device according to the present invention.

FIG. 4 schematically shows a display 35 of the external display or evaluation unit 34 presenting a camera picture showing the tip 20 of the nozzle 22 with the orifice 23 of the nozzle substantially in the center of the tip 20. Inside the orifice 23 the pilot laser beam 24 is shown by a dotted circle prior to the adjustment and by a solid circle after the adjustment of the laser beam. In particular, the camera view clearly visualizes not only the location of the pilot laser beam within the orifice 23 for X/Y adjustment, but also the changes in beam diameter when vertical or Z adjustment of the optical elements in the laser machining head 11 is performed. Thus, not only adjustment of the laser beam in an X/Y direction (perpendicular to the optical axis) can be performed but also in Z direction, i.e. in the direction of the optical axis or beam path. Therefore, it is at least possible to verify whether manual or motor operated means for vertical adjustment work.

Thus, the sensor device 10 according to the present invention offers several advantages. At first, it is not necessary to involve the use of the laser beam, i. e. the solid state laser (YAG lasers, fiber lasers, disk lasers, diode lasers) or CO2 laser used for the cut process, therefore performing adjustment using the inventive sensor device causes no health hazard for the operators. Further, the sensor device 10 according to the present invention is portable and can be used for adjusting the optical elements of laser machining heads of more than one machine in a fab shop, research institute or industrial laboratory environment. In particular, using interchangeable adapters make it is possible to easily apply the sensor device according to the present invention to the lower part of conventional cutting heads without requiring any specific mounting tool.

What is claimed:

1. A portable sensor device for determining alignment/misalignment of a laser beam relative to a gas nozzle of a laser machining head comprising:
    a sensor housing provided with mounting means adapted to mount the housing to a laser machining head, wherein the sensor housing is configured to be held safely by the mounting means to the laser machining head,
    a camera device comprising a camera, the camera device is provided in the sensor housing, so that the camera faces the tip of the gas nozzle when the sensor housing is mounted to the laser machining head for visualizing an orifice of the gas nozzle and a pilot laser simultaneously, and
    output means for outputting image signals obtained by the camera,
    wherein the camera device comprises centering means arranged in a defined distance in front of the camera and adapted to center the camera against the gas nozzle when the sensor housing is mounted to the laser machining head.

2. The portable sensor device according to claim 1, wherein the camera device comprises an internal illumination assembly arranged around the camera for illuminating its field of view.

3. The portable sensor device according to claim 1, wherein the camera device comprises a micro lens assembly arranged in front of the camera.

4. The portable sensor device according to claim 3, wherein the camera device further comprises an optical filter arranged in front of the micro lens assembly, wherein the spectral transparence of the filter is selected in view of the wavelength of the pilot laser and the spectral sensitivity of an image sensor of the camera.

5. The portable sensor device according to claim 1, wherein the mounting means comprises an adapter detachably mounted to the housing.

6. The portable sensor device according to claim 5, wherein the camera device and the adapter are supported by the housing in such a way that they can move relative to each other, so that the camera device can be pushed by a spring against the gas nozzle when the sensor housing is mounted to the laser machining head by means of the adapter.

7. The portable sensor device according to claim 1, wherein output means comprises a wired or wireless interface.

8. The portable sensor device according to claim 7, wherein the wireless interface is a Bluetooth interface.

* * * * *